(12) United States Patent
Nagel et al.

(10) Patent No.: US 11,358,578 B2
(45) Date of Patent: Jun. 14, 2022

(54) ELECTROMECHANICAL BRAKE BOOSTER AND METHOD FOR PRODUCING AN ELECTROMECHANICAL BRAKE BOOSTER

(71) Applicant: Robert Bosch GmbH, Stuttgart (DE)

(72) Inventors: Willi Nagel, Remseck/Hochdorf (DE); Daniel Weissinger, Korntal-Muenchingen (DE); Giammaria Panunzio, Ludwigsburg (DE); Andre Bollwerk, Steinheim an der Murr (DE)

(73) Assignee: Robert Bosch GmbH, Stuttgart (DE)

( * ) Notice: Subject to any disclaimer, the term of this patent is extended or adjusted under 35 U.S.C. 154(b) by 25 days.

(21) Appl. No.: 15/759,109

(22) PCT Filed: Sep. 2, 2016

(86) PCT No.: PCT/EP2016/070730
§ 371 (c)(1),
(2) Date: Mar. 9, 2018

(87) PCT Pub. No.: WO2017/045936
PCT Pub. Date: Mar. 23, 2017

(65) Prior Publication Data
US 2019/0047530 A1  Feb. 14, 2019

(30) Foreign Application Priority Data

Sep. 14, 2015 (DE) .......................... 102015217518.9

(51) Int. Cl.
*B60T 13/74* (2006.01)
*F16D 65/18* (2006.01)
(Continued)

(52) U.S. Cl.
CPC ............ *B60T 13/745* (2013.01); *B60T 13/74* (2013.01); *F16D 65/18* (2013.01);
(Continued)

(58) Field of Classification Search
CPC ............... B60T 13/745; F16D 2125/48; F16D 2250/0084
See application file for complete search history.

(56) References Cited

U.S. PATENT DOCUMENTS

2009/0314132 A1* 12/2009 Campbell ............. F16H 57/025
74/606 R
2014/0090371 A1   4/2014 Yoshizu et al.
(Continued)

FOREIGN PATENT DOCUMENTS

CN      203005406 U     6/2013
DE    102012014361 A1   1/2014
(Continued)

OTHER PUBLICATIONS

International Search Report dated Nov. 15, 2016, of the corresponding International Application PCT/EP2016/070730 filed Sep. 2, 2016.

*Primary Examiner* — Bradley T King
(74) *Attorney, Agent, or Firm* — Norton Rose Fulbright US LLP; Gerard Messina

(57) ABSTRACT

An electromechanical brake booster, the second half housing being able to be centered on the first half housing by engaging a first mounting pin protruding from the first centering opening into the first insertion opening and by engaging a second mounting pin protruding from the second centering opening into the second insertion opening. A method for producing an electromechanical brake booster for a motor vehicle is also described.

7 Claims, 3 Drawing Sheets

(51) Int. Cl.
   *F16D 121/24*     (2012.01)
   *F16D 125/48*     (2012.01)
   *F16D 55/00*      (2006.01)

(52) U.S. Cl.
   CPC .... *F16D 2055/007* (2013.01); *F16D 2121/24* (2013.01); *F16D 2125/48* (2013.01); *F16D 2250/0084* (2013.01)

(56) References Cited

U.S. PATENT DOCUMENTS

| | | | |
|---|---|---|---|
| 2014/0283513 A1 | 9/2014 | Watanabe et al. | |
| 2014/0373526 A1* | 12/2014 | Ohnishi | B60T 13/745 60/545 |
| 2016/0185330 A1* | 6/2016 | Lee | B60T 1/10 303/10 |
| 2017/0028976 A1* | 2/2017 | Pattok | B60T 13/745 |
| 2018/0202517 A1* | 7/2018 | Jang | F16H 1/28 |
| 2018/0257619 A1* | 9/2018 | Wingender | B60T 13/745 |
| 2019/0152462 A1* | 5/2019 | Panunzio | B60T 7/02 |
| 2020/0010068 A1* | 1/2020 | Nagel | F16H 57/021 |

FOREIGN PATENT DOCUMENTS

| | | |
|---|---|---|
| DE | 102013006795 A1 | 10/2014 |
| DE | 102015217518 A1 | 3/2017 |
| EP | 2636565 A1 | 9/2013 |
| EP | 2666686 A1 | 11/2013 |
| FR | 2810953 A1 | 1/2002 |
| FR | 2947228 A1 | 12/2010 |
| JP | H05246627 A | 9/1993 |
| JP | 2009529616 A | 8/2009 |
| JP | 2012035814 A | 2/2012 |
| WO | 2014012702 A1 | 1/2014 |
| WO | 2015114842 A1 | 8/2015 |

* cited by examiner

ELECTROMECHANICAL BRAKE BOOSTER AND METHOD FOR PRODUCING AN ELECTROMECHANICAL BRAKE BOOSTER

FIELD

The present invention relates to an electromechanical brake booster for a motor vehicle. The present invention furthermore relates to a method for producing an electromechanical brake booster for a motor vehicle.

BACKGROUND INFORMATION

Future drive concepts of motor vehicles require alternative brake pressure buildup devices since little or no vacuum is available in order to operate a conventional vacuum brake booster. Electric motor brake boosters were developed for this purpose.

German Patent Application No. DE 10 2012 014 361 A1 describes a control device for a master brake cylinder of a motor vehicle, comprising a housing to be situated between the master brake cylinder and a brake pedal, through which a pressure organ for controlling a control piston of the master brake cylinder runs, an electric motor, a worm, which is driven by the electric motor and which intersects the pressure organ, and a gear unit situated in the housing, which couples the worm with the control piston so as to translate a rotary motion of the worm into a translatory motion of the control piston.

SUMMARY

An object of the present invention is to provide an improved electromechanical brake booster that has lower production costs and is simpler to produce.

An electromechanical brake booster for a motor vehicle and an electromechanical brake booster for a motor vehicle in accordance with the present invention are described herein.

The present invention provides an electromechanical brake booster for a motor vehicle, having a housing having a first half housing and a second half housing, in which an electric motor and a gear unit are situated, wherein a first centering opening and a second centering opening are developed on the first half housing and a first insertion opening and a second insertion opening are developed on the second half housing, the first centering opening being situated with respect to the first insertion opening and the second centering opening being situated with respect to the second insertion opening in such a way that it is possible to center the second half housing on the first half housing by engaging a first mounting pin protruding from the first centering opening into the first insertion opening and by engaging a second mounting pin protruding from the second centering opening into the second insertion opening and/or that it is possible to center the electric motor with respect to the gear unit by a bearing plate of the electromechanical brake booster in that the bearing plate fastened on an axle of a toothed wheel of the gear unit has a receiving opening into which a housing section of the electric motor is inserted.

The present invention furthermore provides a method for producing an electromechanical brake booster for a motor vehicle. The method comprises a provision of a first half housing and a second half housing of a housing in which it is possible to situate an electric motor and a gear unit; the method comprises furthermore a provision of a first centering opening and a second centering opening on the first half housing and a first insertion opening and a second insertion opening on the second half housing, the first centering opening being concentric with respect to the first insertion opening and the second centering opening being concentric with respect to the second insertion opening; the method comprises furthermore an engagement of a first mounting pin protruding from the first centering opening into the first insertion opening and an engagement of a second mounting pin protruding from the second centering opening into the second insertion opening for centering the first half housing on the second half housing; and/or a centering of the electric motor with respect to the gear unit by a bearing plate of the electromechanical brake booster by fastening the bearing plate on an axle of a toothed wheel of the gear unit and situating the bearing plate in such a way that a housing section of the electric motor is inserted into a receiving opening of the bearing plate.

In accordance with an embodiment of the present invention, the first half housing and the second half housing of the housing of the electromechanical brake booster are centered during the production of the electromechanical brake booster. The use of mounting pins makes it advantageously possible to center the first half housing and the second half housing in an assembly line of the electromechanical brake booster. It is thus possible to perform the production method efficiently.

Advantageous specific embodiments and developments result from the description herein with reference to the figures.

A preferred development of the present invention provides for a housing bottom of the first half housing to have a third centering opening, in which a third mounting pin is insertable for positioning the first half housing relative to the second half housing. It is thus possible to position the first half housing efficiently relative to the second half housing.

Another preferred development of the present invention provides for the third centering opening developed on the first half housing to have a bore introduced into a housing bottom, and the first centering opening developed on the first half housing, which is situated on a housing section of the first half housing across from the housing bottom, having a bore introduced into the housing section of the first half housing. The third centering opening developed on the first half housing and the first centering opening developed on the first half housing are preferably developed to be sturdy by being integrally developed with the first half housing.

Another preferred development of the present invention provides for the first centering opening and the third centering opening to be situated along a common longitudinal axis of the housing. This allows for a stable centering of the first half housing with respect to the second half housing without one of the half housings tilting.

Another preferred development of the present invention provides for first insertion opening developed in the second half housing to be developed as a passage, the first centering opening developed in the first half housing extending through the first insertion opening. The development of the first insertion opening developed in the second half housing as a passage achieves an improved stability of the first insertion opening with respect to transverse forces.

Another preferred development of the present invention provides for the second centering opening developed in the first half housing and the second insertion opening developed in the second half housing to be developed as an oblong hole, the second centering opening and the second insertion opening being oriented along a straight line extending between the second insertion opening and the first insertion opening. By developing the second centering opening developed in the first half housing and the second insertion opening developed in the second half housing as an oblong hole, a simple centering of the first half housing with respect to the second half housing is made possible.

Another preferred development of the present invention provides for the first mounting pin and/or the second mounting pin to be rigidly connected with the first half housing. This advantageously eliminates an insertion of the mounting pins into the respective centering openings.

Another preferred development of the present invention provides for the bearing plate to be press-fit in a recess developed in the first half housing. The bearing plate is thus able to be situated in the first half housing particularly in a way that saves space and that is fixed in place.

Another preferred development of the present invention provides for the bearing plate to define a center-to-center distance between the toothed wheel of the gear unit and the motor pinion of the electric motor. This makes it possible advantageously to achieve an exact engagement of the motor pinion of the electric motor with the toothed wheel of the gear unit.

Another preferred development of the present invention provides for the receiving opening developed in the bearing plate to receive the motor pinion of the electric motor. It is thus possible to position the motor pinion in such a way that it meshes with the toothed wheel of the gear unit.

The described embodiments and developments of the present invention may be combined with one another as desired.

Additional possible embodiments, developments and implementations of the present invention also include combinations of features of the present invention that are not explicitly mentioned above or below with respect to the exemplary embodiments.

BRIEF DESCRIPTION OF THE DRAWINGS

The figures are intended to provide a better understanding of the specific embodiments of the present invention. They illustrate specific embodiments and serve to explain principles and developments of the present invention in connection with the specification.

Other specific embodiments and many of the mentioned advantages result in view of the figures. The represented elements of the figures are not necessarily drawn to scale with respect to one another.

Unless indicated otherwise, identical reference symbols in the figures indicate identical or functionally equivalent elements, parts or components.

DETAILED DESCRIPTION OF EXAMPLE EMBODIMENTS

Figure 1:
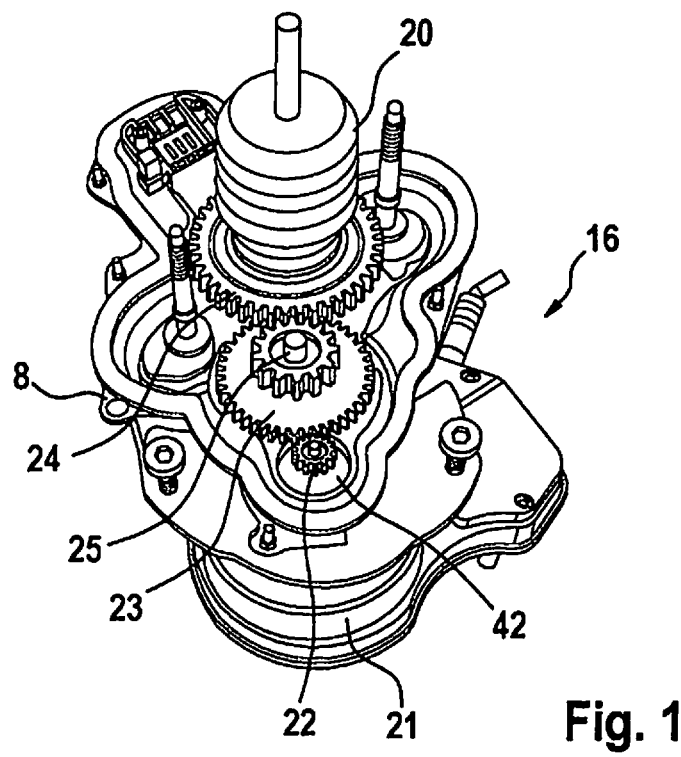
FIG. 1 shows a perspective representation of a gear unit of an electromechanical brake booster for a motor vehicle according to a preferred specific embodiment of the present invention.

FIG. 1 shows a perspective representation of a gear unit 16 of an electromechanical brake booster 1 for a motor vehicle according to a preferred specific embodiment of the present invention.

Gear unit 16 has an electric motor 21 or an electric motor/control unit assembly, a motor pinion 22 driving a graduated toothed wheel 23 or twin toothed wheel. Toothed wheel 23 in turn drives a toothed wheel 24, which is connected to a spindle nut (not shown in FIG. 1). A bellows 20 is preferably situated around the spindle nut.

Toothed wheel 23 is rotationally mounted on an axle 25. A ball bearing is preferably disposed between motor pinion 22 and electric motor 21.

Figure 2:
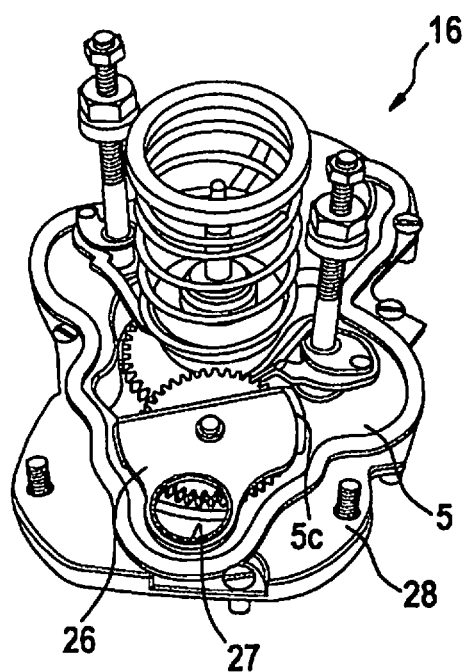
FIG. 2 shows a perspective representation of a gear unit of the electromechanical brake booster for the motor vehicle according to the preferred specific embodiment of the present invention.

FIG. 2 shows a perspective representation of a gear unit of the electromechanical brake booster for the motor vehicle according to the preferred specific embodiment of the present invention.

A bearing plate 26 is mounted or press-fit into the one half housing 5. Axle 25 is rigidly connected both with first half housing 5 as well as with bearing plate 26. It is possible to position or center electric motor 21 via a receiving opening 27 in bearing plate 26. A housing section 42 of electric motor 21 is inserted into receiving opening 27.

Electric motor 21 is preferably screw-fitted on a housing flange 28. Alternatively, motor/control unit assembly 21 may also be connected with housing flange 28 in another suitable manner. As a result of the aforementioned construction, toothed wheel 23, toothed wheel 24, bearing plate 26 and electric motor 21 are centered or fastened directly via first half housing 5. First half housing 5 is preferably made of aluminum. A second half housing 8 that is preferably made of plastic thus does not have to have a load-bearing function.

A center-to-center distance between toothed wheel 23 and the motor pinion (not shown in FIG. 2), which must be very precise, is ensured by bearing plate 26. Bearing plate 26 is preferably developed as a stamped sheet metal part.

Figure 3:
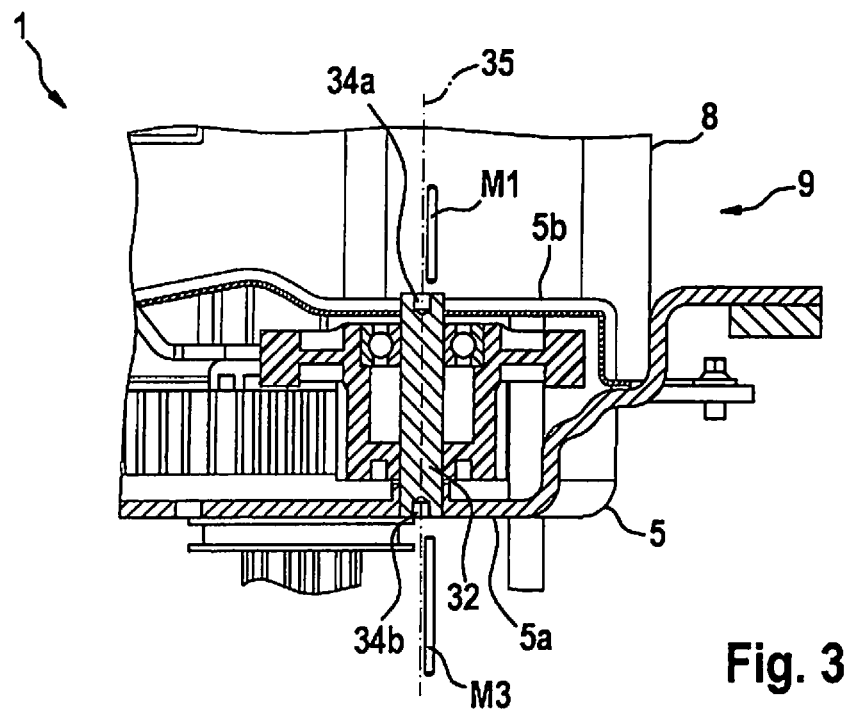
FIG. 3 shows a part-sectional view of a housing of the electromechanical brake booster for the motor vehicle according to the preferred specific embodiment of the present invention.

FIG. 3 shows a part-sectional view of a housing of the electromechanical brake booster for the motor vehicle according to the preferred specific embodiment of the present invention.

First half housing 5 and second half housing 8 are preferably made of steel. Since no separate bearing plate is provided, first half housing 5 must be positioned exactly with respect to second half housing 8.

First half housing 5 has a first centering opening 34a and a second centering opening 36a. Second half housing 8 has a first insertion opening (not shown in FIG. 3) and a second insertion opening (not shown in FIG. 3).

The first centering opening 34a is situated preferably concentrically with respect to first insertion opening 8a. Second centering opening 36a is situated preferably concentrically with respect to second insertion opening 36b.

Second half housing 8 is able to be centered on first half housing 5 by engaging a first mounting pin M1 protruding from first centering opening 34a into first insertion opening 8a and by engaging a second mounting pin M2 protruding from second centering opening 36a (not shown in FIG. 3) into second insertion opening 36b.

A housing bottom 5a of first half housing 5 preferably has a third centering opening 34b, into which a third mounting pin M3 is insertable for positioning first half housing 5 relative to second half housing 8. First centering opening 34a and third centering opening 34b are preferably developed in the form of a bore or alternatively in the form of a cone. Alternatively, the respective mounting pin may have a bore for example and the respective centering opening may be developed in the form of a cone, which is insertable into the bore developed in the mounting pin.

First centering opening 34a and third centering opening 34b are preferably situated along a common longitudinal axis 35 of housing 9.

Figure 4:
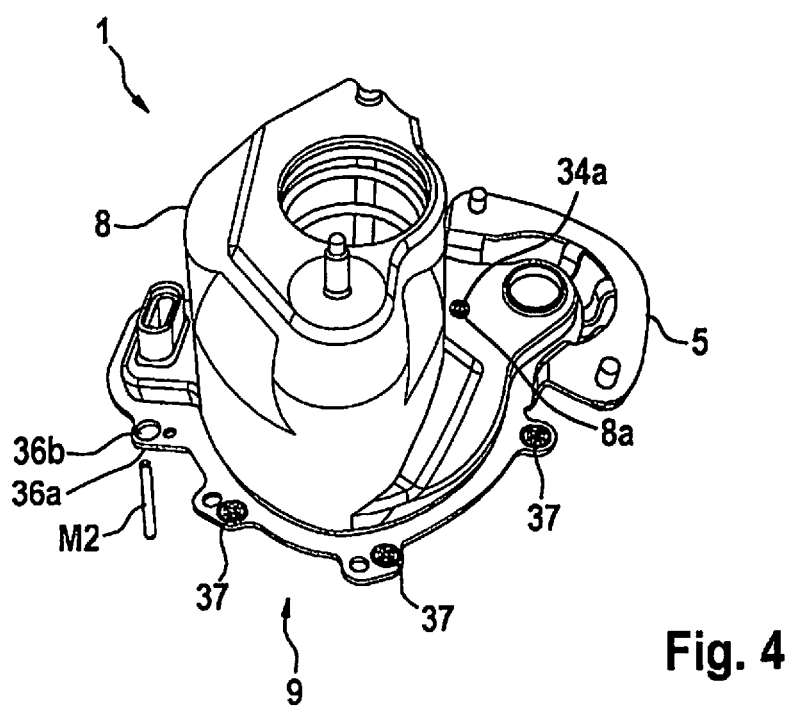
FIG. 4 shows a perspective representation of the housing of the electromechanical brake booster for the motor vehicle according to the preferred specific embodiment of the present invention.

FIG. 4 shows a perspective representation of the housing of the electromechanical brake booster for the motor vehicle according to the preferred specific embodiment of the present invention.

Second half housing 8 is able to be centered with respect to first half housing 5 by engaging the second mounting pin M2 protruding from second centering opening 36a into second insertion opening 36b.

The first insertion opening 8a developed in second half housing 8 is preferably developed as a passage, the first centering opening 34a developed in first half housing 5 extending through first insertion opening 8a.

The second centering opening 36a developed in first half housing 5 and the second insertion opening 36b developed in second half housing 8 are preferably developed as oblong holes, the second centering opening 36a and the second insertion opening 36b being oriented along a straight line extending between second insertion opening 36b and first insertion opening 8a.

First half housing 5 is preferably able to be screw-fitted to second half housing 8 by a plurality of bolts 37.

Figure 5:
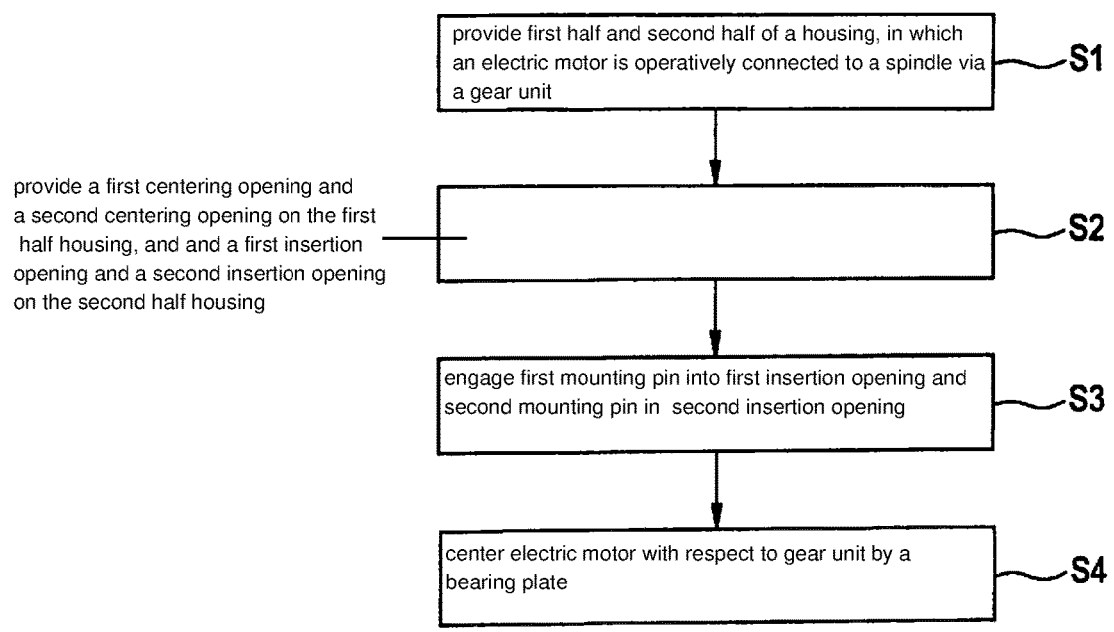
FIG. 5 shows a flow chart of a method for the assembly of the electromechanical brake booster for the motor vehicle according to the preferred specific embodiment of the present invention.

FIG. 5 shows a flow chart of a method for the assembly of the electromechanical brake booster for the motor vehicle according to the preferred specific embodiment of the present invention.

The method comprises a provision S1 of a first half and a second half of a housing, in which an electric motor is operably connected to a spindle via a gear unit. The method furthermore comprises a provision S2 of a first centering opening and a second centering opening on the first half housing and a first insertion opening and a second insertion opening on the second half housing, the first centering opening being concentrically situated with respect to the first insertion opening and the second centering opening being concentrically situated with respect to the second insertion opening.

The method furthermore comprises an engagement S3 of a first mounting pin protruding from the first centering opening into the first insertion opening and of a second mounting pin protruding from the second centering opening into the second insertion opening for centering the second half housing on the first half housing and/or a centering S4 of the electric motor with respect to the gear unit by a bearing plate of the electromechanical brake booster by fastening the bearing plate on an axle of a toothed wheel of the gear unit and situating the bearing plate in such a way that a motor pinion of the electric motor is inserted into a receiving opening of the bearing plate and that the motor pinion inserted into the receiving opening meshes with the toothed wheel of the gear unit.

Although the present invention was described above with reference to preferred exemplary embodiments, it is not limited to these and may be modified in numerous ways. In particular, the present invention may be changed or modified in many ways without deviating from the essence of the present invention.

For example, it is possible to situate the centering openings and/or the insertion openings in a different suitable position on the housing.

LIST OF REFERENCE SYMBOLS 1 brake booster
5 first half housing
5a housing bottom
5b housing section
5c recess
8 second half housing
8a first insertion opening
9 housing
16 gear unit
20 bellows
21 electric motor
22 motor pinion
23 twin toothed wheel
24 toothed wheel
25 axle
26 bearing plate
27 receiving opening
28 housing flange
34a first centering opening
34b third centering opening
35 longitudinal axis
36a second centering opening
36b second insertion opening
37 bolts
42 housing section of the electric motor
M1 first mounting pin
M2 second mounting pin
M3 third mounting pin

What is claimed is:

1. An electromechanical brake booster for a motor vehicle, comprising:
a housing having a first half housing and a second half housing, in which an electric motor and a gear unit are situated, a first centering opening and a second centering opening being in the first half housing, and a first insertion opening and a second insertion opening being in the second half housing, the first centering opening being situated with respect to the first insertion opening and the second centering opening being situated with respect to the second insertion opening in such a way that it is possible to center the second half housing on the first half housing by engaging a first mounting pin protruding from the first centering opening into the first insertion opening and by engaging a second mounting pin protruding from the second centering opening into the second insertion opening, wherein a housing bottom of the first half housing has a third centering opening into which a third mounting pin is insertable for positioning the first half housing relative to the second half housing, wherein:
each of the first mounting pin, the second mounting pin, and the third mounting pin engages a surface of a respective one of the first centering opening, the second centering opening, and the third centering opening in order for the first mounting pin, the second mounting pin, and the third mounting pin to protrude from a respective one of the first centering opening, the second centering opening, and the third centering opening, and the first mounting pin and the second mounting pin protrude into, without being fixed to a surface of, a respective one of the first insertion opening and the second insertion opening.

2. The electromechanical brake booster as recited in claim 1, wherein the third centering opening in the first half housing has a bore introduced into the housing bottom, and the first centering opening in the first half housing, which is situated on a housing section of the first half housing across from the housing bottom, having a bore introduced into the housing section of the first half housing.

3. The electromechanical brake booster as recited in claim 1, wherein the first centering opening and the third centering opening in the first half housing are situated along a common longitudinal axis of the housing.

4. An electromechanical brake booster for a motor vehicle, comprising:
   a housing having a first half housing and a second half housing, in which an electric motor and a gear unit are situated, a first centering opening and a second centering opening being in the first half housing, and a first insertion opening and a second insertion opening being in the second half housing, the first centering opening being situated with respect to the first insertion opening and the second centering opening being situated with respect to the second insertion opening in such a way that it is possible to center the second half housing on the first half housing by engaging a first mounting pin protruding from the first centering opening into the first insertion opening and by engaging a second mounting pin protruding from the second centering opening into the second insertion opening, wherein the first insertion opening in the second half housing is a passage, the first centering opening in the first half housing communicating with the first insertion opening, and wherein the first centering opening extends through the first insertion opening, wherein:
   each of the first mounting pin and the second mounting pin engages a surface of a respective one of the first centering opening and the second centering opening in order for the first mounting pin and the second mounting pin to protrude from a respective one of the first centering opening and the second centering opening, and
   the first mounting pin and the second mounting pin protrude into, without being fixed to a surface of, a respective one of the first insertion opening and the second insertion opening.

5. An electromechanical brake booster for a motor vehicle, comprising:
   a housing having a first half housing and a second half housing, in which an electric motor and a gear unit are situated, a first centering opening and a second centering opening being in the first half housing, and a first insertion opening and a second insertion opening being in the second half housing, the first centering opening being situated with respect to the first insertion opening and the second centering opening being situated with respect to the second insertion opening in such a way that it is possible to center the second half housing on the first half housing by engaging a first mounting pin protruding from the first centering opening into the first insertion opening and by engaging a second mounting pin protruding from the second centering opening into the second insertion opening, wherein the second centering opening in the first half housing and the second insertion opening in the second half housing are oblong holes, the second centering opening and the second insertion opening being oriented along a straight line extending between the second insertion opening and the first insertion opening.

6. An electromechanical brake booster for a motor vehicle, comprising:
   a housing having a first half housing and a second half housing, in which an electric motor and a gear unit are situated, wherein it is possible to center the electric motor with respect to the gear unit by a bearing plate of the electromechanical brake booster in that the bearing plate is fastened on an axle of a toothed wheel of the gear unit and has a receiving opening into which a housing section of the electric motor is inserted, wherein the bearing plate is press-fit in a recess in the first half housing.

7. A method for producing an electromechanical brake booster for a motor vehicle, comprising:
   providing a first half housing and a second half housing of a housing, in which it is possible to situate an electric motor and a gear unit;
   providing a first centering opening and a second centering opening in the first half housing, and a first insertion opening and a second insertion opening in the second half housing, the first centering opening being concentric with respect to the first insertion opening and the second centering opening being concentric with respect to the second insertion opening;
   engaging a first mounting pin protruding from the first centering opening into the first insertion opening and a second mounting pin protruding from the second centering opening into the second insertion opening for centering the second half housing on the first half housing; and
   providing a third centering opening in a housing bottom of the first half housing, a third mounting pin being insertable into the third centering opening for positioning the first half housing relative to the second half housing, wherein:
   each of the first mounting pin, the second mounting pin, and the third mounting pin engages a surface of a respective one of the first centering opening, the second centering opening, and the third centering opening in order for the first mounting pin, the second mounting pin, and the third mounting pin to protrude from a respective one of the first centering opening, the second centering opening, and the third centering opening, and
   the first mounting pin and the second mounting pin protrude into, without being fixed to a surface of, a respective one of the first insertion opening and the second insertion opening.

* * * * *